(12) United States Patent
Bindelle et al.

(10) Patent No.: US 7,691,337 B2
(45) Date of Patent: Apr. 6, 2010

(54) THERMAL CONDITIONING CONTAINER AND METHOD OF MANUFACTURING IT

(75) Inventors: Jean-Paul Bindelle, Mont-Saint-Guibert (BE); Philippe Guiche, Brussels (BE); Manuel De Francisco, Brussels (BE); Daniel Borremans, Mont-sur-Marchienne (BE); Thierry Cartage, Brussels (BE)

(73) Assignee: SOLVAY (Societe Anonyme), Brussels (BE)

( * ) Notice: Subject to any disclaimer, the term of this patent is extended or adjusted under 35 U.S.C. 154(b) by 531 days.

(21) Appl. No.: 11/630,979

(22) PCT Filed: Jun. 28, 2005

(86) PCT No.: PCT/EP2005/053027

§ 371 (c)(1),
(2), (4) Date: Dec. 28, 2006

(87) PCT Pub. No.: WO2006/003145

PCT Pub. Date: Jan. 12, 2006

(65) Prior Publication Data

US 2007/0248504 A1    Oct. 25, 2007

(30) Foreign Application Priority Data

Jun. 29, 2004   (FR)   .................................. 04 07158

(51) Int. Cl.
*B01J 19/00*    (2006.01)
*B21D 53/02*    (2006.01)

(52) U.S. Cl. ........................ 422/138; 422/202; 422/240; 422/242; 220/592.28; 220/592; 29/890.03; 29/890.054

(58) Field of Classification Search ................. 422/138, 422/202, 240, 242; 220/592.28, 592; 29/890.03, 29/890.054, 402.07
See application file for complete search history.

(56) References Cited

U.S. PATENT DOCUMENTS 2,772,860  A    12/1956   Nelson (Continued)

FOREIGN PATENT DOCUMENTS

DD          245 366         5/1987

(Continued)

OTHER PUBLICATIONS

Inoue T., et al., "New Type High Performance Reactor for PVC Polymerization", American Chemica L Society, vol. 44, pp. 51-54, 1996.

*Primary Examiner*—N. Bhat
(74) *Attorney, Agent, or Firm*—Oblon, Spivak, McClelland, Maier & Neustadt, L.L.P.

(57) ABSTRACT

A container for thermal conditioning of a fluid under pressure, use of the container for thermally conditioning a fluid under pressure, a chemical reactor including the container and a polymerization process using the reactor, and a method of producing the container and the reactor. The container is bounded over at least part of its surface facing the outside by at least one external plate and facing the inside by at least one internal plate, the external plate being thicker than the internal plate, the external plate and the internal plate being joined together in places to define a space between joints for circulation of a heat-transfer fluid and the container including a mechanism to adjust the pressure of the heat-transfer fluid to that of the fluid under pressure.

21 Claims, 2 Drawing Sheets

U.S. PATENT DOCUMENTS

| | | | |
|---|---|---|---|
| 3,458,917 A | | 8/1969 | Mueller |
| 4,093,100 A | * | 6/1978 | Ford et al. .................. 220/592 |
| 4,221,763 A | | 9/1980 | Greene |
| 4,552,724 A | | 11/1985 | Matsumoto et al. |
| 5,027,971 A | * | 7/1991 | Perryman ................... 165/154 |
| 5,328,666 A | * | 7/1994 | Amano et al. ............... 422/138 |
| 5,667,758 A | * | 9/1997 | Matsugi et al. ............. 422/198 |
| 5,975,335 A | * | 11/1999 | Witenhafer ............ 220/592.05 |

FOREIGN PATENT DOCUMENTS

| | | |
|---|---|---|
| DE | 44 16 645 | 11/1995 |
| EP | 0 012 410 | 6/1980 |
| EP | 0 395 080 | 10/1990 |
| FR | 1 205 978 | 2/1960 |
| FR | 2 225 230 | 11/1974 |
| FR | 2 287 285 | 5/1976 |
| FR | 2 746 488 | 9/1997 |
| FR | 2 789 916 | 8/2000 |
| GB | 1 453 614 | 10/1976 |
| JP | 05 337362 | 12/1993 |
| JP | 08 126838 | 5/1996 |
| JP | 10 244146 | 9/1998 |
| WO | 99 58920 | 11/1999 |

* cited by examiner

THERMAL CONDITIONING CONTAINER AND METHOD OF MANUFACTURING IT

BACKGROUND OF THE PRESENT INVENTION

1. Field of the Invention

This application is a 371 of PCT/EP05/053027, filed Jun. 28, 2005, and claims priority to French Patent Application No. 04.07158, filed Jun. 29, 2004.

The subject of the invention is a container for the thermal conditioning of a fluid under pressure, its use, a chemical reactor, a polymerization process using it and a method of manufacturing the container and the reactor.

2. Description of Related Art

When it is necessary to carry out heat exchange in a container intended to contain a fluid under pressure, one is generally confronted with the problem of controlling the heat exchange (thermal conditioning of the fluid), namely to remove the heat generated or to supply the heat needed. In particular in exothermic or endothermic reactions, one is faced with the problem of removing the heat generated by the reaction or alternatively supplying the heat needed for it.

Many containers intended to contain fluids under pressure have already been described, in particular those in which a double-walled jacket in which the heat-transfer fluid for controlling the heat exchange circulates, is fixed to the outer face of the outer wall of the container. In this particular case, the heat flux must pass through the thickness of the wall, which results in low heat exchange coefficients for heat exchange between the fluid under pressure and the heat-transfer fluid, leading in the particular case of a polymerization reaction to an increase in the polymerization time and a loss of efficiency of the plant.

Other containers intended to contain fluids under pressure in which the double-walled jacket is fixed to the inner face of the outer wall of the container have also been described.

Thus, document EP 0 012 410 B1 describes a container for carrying out exothermic and endothermic reactions, in particular the polymerization of vinyl chloride by controlling the heat exchange by means of a heat-transfer fluid circulating in a double-walled jacket fixed to the inner face of the outer wall of the apparatus. The double-walled jacket is produced by welding, to the internal face of the wall of the container, a semi-tubular coil consisting of half-tubes in the form of semi-circular tubes so that they form a winding with touching turns. This type of container is characterized by a better heat exchange coefficient than those exhibited by the prior containers with a double-walled jacket fixed to the outer wall of the container, but it is still low. It is also complicated to produce, resulting in very high construction costs. Finally, because the half-tubes form, between them, on the inside of the container a very sharp angle (a discontinuity), this type of container has a major drawback, as the container shown diagrammatically in Patent Application FR 2746488 also has, in particular when it is used for a polymerization, especially for the polymerization of vinyl chloride, namely the fact that the polymer formed is disadvantageously deposited in the regions between the half-tubes on the inside of the container. This means that the polymerization cycle has to be interrupted more often in order to clean the reactor. The productivity of such a process is greatly affected thereby.

DETAILED DESCRIPTION

The aim of the invention is to remedy the drawbacks of the known containers and of the processes used for manufacturing them, by providing a novel container and a novel method of manufacturing it.

Consequently, the invention relates to a container for the thermal conditioning of a fluid under pressure, which is bounded (delimited) over at least a portion of its surface facing the outside by at least one external plate and facing the inside by at least one internal plate, the external plate being thicker than the internal plate, the external plate and the internal plate being joined together in places so as to define a space between the joints for the circulation of a heat-transfer fluid and the container being provided with means intended for adjusting the pressure of the heat-transfer fluid to that of the fluid under pressure.

The term "container" is understood to mean, for the purposes of the present invention, a closed hollow vessel that serves for receiving or containing a fluid.

The term "fluid" is understood to mean, for the purposes of the present invention, a liquid, a gas, a liquid/gas, liquid/solid or gas/solid two-phase medium or a liquid/gas/solid three-phase medium.

The expression "fluid under pressure" is understood to mean, for the purposes of the present invention, a fluid advantageously under a pressure above atmospheric pressure, preferably above 2 and particularly preferably above 4 bar relative (expressed relative to atmospheric pressure).

The expression "defined space between the joints for the circulation of a heat-transfer fluid" is understood to mean, for the purposes of the present invention, the space (or volume) in which the heat-transfer fluid can circulate, more commonly called a double-walled jacket or jacket.

The term "plate" is understood to mean, for the purposes of the present invention, a sheet of rigid material or several of these sheets intimately bonded together. Considered, therefore, as one particular case of plates within the meaning of the present invention are metal sheets which are, within the context of the present invention, metal sheets obtained by rolling.

The expression "external plate defining the container over at least a portion of its surface facing the outside" typically denotes the plate constituting, partly, the outer wall of the container. This may optionally be equipped with or surrounded on the outside of the container by any piece of equipment needed for the use of the container according to the invention. For example, it may be an isolating chamber or a confinement chamber.

The expression "internal plate defining the container over at least a portion of its surface facing the inside" typically denotes the plate constituting the internal wall of the double-walled jacket. This is advantageously in direct contact on the inside of the container with the fluid contained in the container.

The material used for the internal plate can be of any type whatsoever, provided that it can be joined to the external plate and provided that this material has a low thermal resistance. Advantageously, it is chosen from metallic materials such as, for example, carbon steels, stainless steels, titanium, titanium alloys, aluminium, aluminium alloys, nickel, nickel alloys, such as for example the alloys INCOLOY®, HASTELLOY®, INCONEL®, and MONEL®, copper, tantalum and zirconium. It will also be possible to choose a polymeric material having a low thermal resistance or a metallic material coated with a polymeric material.

The material used for the internal plate is preferably chosen from stainless steels. The term "stainless steel" is intended to denote in particular ferritic stainless steels, martensitic stainless steel and austenitic stainless steels, including superaustenitic and austeno-ferritic stainless steels. The material used for the internal plate is particularly preferably austenitic stainless steel and most particularly preferably superaustenitic stainless steel.

The material used for the external plate may be of any type whatsoever. Advantageously, it is chosen from the materials used for the internal plate, such as stainless steels, titanium, titanium alloys, aluminium, aluminium alloys, nickel, nickel alloys, copper, tantalum, zirconium and materials consisting of two or more of these materials, and also chosen from carbon steels clad with one of the aforementioned materials.

Preferably, the material used for the external plate is chosen from stainless steels and carbon steels clad with a stainless steel. Particularly preferably, the material used for the external plate is chosen from austenitic stainless steels and carbon steels clad with an austenitic stainless steel. Most particularly preferably, the material used for the external plate is chosen from superaustenitic stainless steels and carbon steels clad with a superaustenitic stainless steel.

Very good results have been obtained with superaustenitic stainless steel for the internal plate and a carbon steel clad with a superaustenitic stainless steel for the external plate.

The expression "plates joined together in places" is understood to mean, for the purposes of the present invention, that the plates are joined to one another in places, and they are therefore in direct contact with one another at the joints and that there are no joining pieces between the two plates. The joints may be produced in any manner, provided that the internal and external plates are against one another at these joints. They may in particular be produced by adhesive bonding, welding, brazing or any other fastening by any other means.

Advantageously, the joints are welded joints and preferably laser welded joints.

The welding, preferably laser welding, is advantageously spot welding or zone welding.

The term "spot welding" is understood to mean, for the purposes of the present invention, that the weld is localized at certain specific spots on the surface of the two plates. The joints are therefore particularly preferably spot-welded joints.

The term "zone welding" is understood to mean, for the purposes of the present invention, that the weld is such that a zone of welding to the surface of the two plates is defined. The joints are therefore particularly preferably zone-welded joints.

Preferably, the welding is zone welding.

The zone welding may be such that each welded zone is a weld of circular shape or such that each welded zone is defined by one or more juxtaposed weld seams (straight welded lines) (also called weld beads).

The expression "weld of circular shape" is understood to mean, for the purposes of the present invention, that the weld is produced in the form of circles at specific places on the surface of the two plates. The joints are therefore particularly preferably circular welds.

Particularly preferably, the zone welding is such that each welded zone is defined by one or more juxtaposed weld seams. The joints are therefore most particularly preferably welded zones each consisting of one or more juxtaposed weld seams.

The welded zones therefore advantageously have a width of at least 0.1 mm, preferably at least 0.2 mm, particularly preferably at least 0.3 mm and most particularly preferably at least 0.5 mm. The weld zones therefore advantageously have a width of at most 10 mm, preferably at most 8 mm, particularly preferably at most 5 mm and most particularly preferably at most 3 mm, and very particularly preferably at most 2.5 mm.

According to a preferred embodiment, the present invention therefore relates to a container provided with a double-walled jacket on the inner face of its outer wall, whereby the internal wall of the double-walled jacket is a metal sheet of thickness less than that of the metal sheet constituting the outer wall of the container, which is welded to the inner face of the outer wall of the container and deformed so as to define free spaces constituting the jacket.

In the container according to the present invention, the internal plate is advantageously convex between the joints.

The term "convex" is understood to mean that the internal plate moves away from the external plate between the joints, to define a space for the circulation of the heat-transfer fluid.

In the container according to the invention, the external plate advantageously has no point of inflection.

Preferably, the internal plate is convex between the joints and the external plate has no point of inflection.

The container according to the invention is also advantageously characterized in that the internal plate is tangential to the external plate at the joints.

The term "tangential" is understood to mean, for the purposes of the present invention, that the angle made between the internal plate and the external plate at the joints is zero.

The container according to the invention is also advantageously characterized in that the surface of the internal plate is continuous (advantageously, it has no discontinuity).

In the container according to the invention, the external plate is thicker than the internal plate.

The thickness of the internal plate of the container according to the invention is advantageously independent of the size (volume and diameter) and of the shape of the container, and also independent of the pressure present therein. Preferably, this thickness is at most 2.5 mm, particularly preferably at most 2 mm, most particularly preferably at most 1.8 mm and truly most particularly preferably at most 1.5 mm. A thickness of at most 1 mm or even at most 0.5 mm is most particularly preferred.

The thickness of the external plate of the container advantageously depends on the size and the shape of the container and on the pressure present therein. Preferably, this thickness is at least 5 mm and particularly preferably at least 6 mm. Preferably, it is at most 200 mm, particularly preferably at most 100 mm, most particularly preferably at most 60 mm and truly most particularly preferably at most 50 mm.

The container according to the invention is provided with means intended for adjusting the pressure of the heat-transfer fluid to that of the fluid under pressure. The pressure inside the double-walled jacket is therefore advantageously adjusted to the pressure inside the container.

The term "adjusted pressure" is understood to mean, for the purposes of the present invention, that the pressure of the heat-transfer fluid is slightly above, substantially equal to or slightly below that of the fluid under pressure.

The terms "slightly above" and "slightly below" are understood to mean that the pressure difference between the pressure of the heat-transfer fluid and the pressure of the fluid under pressure is advantageously less than or equal to 2 bar, preferably less than or equal to 1 bar.

Preferably, the pressure of the heat-transfer fluid is substantially equal to the pressure of the fluid under pressure. The expression "substantially equal" is understood to mean that the pressure of the heat-transfer fluid is equal to the pressure of the fluid under pressure to within a few per cent.

Any means whatsoever for adjusting the pressure of the heat-transfer fluid to that of the fluid under pressure may be used. For example, it is possible to bring the gas phase present in the overhead of the container into direct communication with the heat-transfer fluid. Optionally, the pressure of the heat-transfer fluid may be adjusted to that of the fluid under pressure by interposing at least one equilibrium membrane or at least one equilibrium bottle. The pressure may also be adjusted by automatic control.

Preferably, the pressure is adjusted by bringing the gas phase present in the overhead of the container into direct communication with the heat-transfer fluid, by interposing at least one equilibrium membrane or at least one equilibrium bottle.

Particularly preferably, the pressure is adjusted by interposing at least one equilibrium bottle. The equilibrium bottle may consist of an equilibrium membrane or of a piston system Most particularly preferably, the pressure is adjusted by interposing at least one equilibrium bottle consisting of an equilibrium membrane and truly most particularly preferably by interposing one equilibrium bottle consisting of an equilibrium membrane. The equilibrium membrane may be made of a metallic material or a polymeric material. It may be flat or be in a form favouring its deformation, such as for example a concertina form.

The space defined between the joints for the circulation of the heat-transfer fluid may have any form whatsoever. Thus, it may have the form of vertical channels, horizontal channels, oblique channels or hairpin-shaped channels, or it may be of free form.

The space defined between the joints preferably has the form of vertical channels or horizontal channels and particularly preferably the form of vertical channels.

The channels advantageously have a width of at most 1000 mm, preferably at most 800 mm, particularly preferably at most 700 mm, most particularly preferably at most 600 mm and truly most particularly preferably at most 500 mm. A width of at most 200 mm, or even at most 100 mm is most particularly preferred. The channels advantageously have a width of at least 30 mm, preferably at least 40 mm, particularly preferably at least 50 mm and most particularly preferably at least 60 mm.

The channels advantageously have a depth (defined as being the longest distance between the internal plate and the external plate) of at most 140 mm, preferably at most 100 mm, particularly preferably at most 60 mm, most particularly preferably at most 40 mm and truly most particularly preferably at most 25 mm. A depth of at most 10 mm, or even at most 5 mm is most particularly preferred. The channels advantageously have a depth of at least 1 mm, preferably at least 2 mm, particularly preferably at least 3 mm and most particularly preferably at least 4 mm.

The heat-transfer fluid that can circulate in the space defined between the joints may be any fluid. It may be a liquid, including a molten metal, or a gas. Preferably, it is a liquid that can be put under pressure, for example spring water, industrial water, demineralized water, brine, glycol water or a thermal oil. Particularly preferably, the heat-transfer fluid is spring water, industrial water or demineralized water. Most particularly preferably, the heat-transfer fluid is demineralized water. Truly most particularly preferably, the heat-transfer fluid is demineralized water with additives. The term "demineralized water with additives" is understood to mean that the demineralized water contains one or more inhibitors, for example corrosion inhibitors and deposit inhibitors, or glycols intended to lower its freezing point.

The container according to the invention is advantageously equipped with any piece of equipment needed for its use. Thus, the container according to the invention is preferably equipped with at least one stirring system, at least one inlet and at least one outlet for the movement of its contents, optionally at least one probe, for example a temperature or pressure probe, optionally at least one safety installation, optionally at least one analyzer and/or optionally at least one level detector.

The container according to the invention may be of any form, provided that it defines a closed volume. Thus, it may be substantially in the form of a cylinder of revolution or one with any base, substantially in the form of a cone of revolution or one with any base, substantially in the form of a pyramid with a regular or any base, or substantially in the form of a parallelepiped with a regular or any polygonal base, or spherical in form.

The term "substantially" is understood to mean, for the purposes of the present invention, that the base or bases of the abovementioned containers may or may not be flat.

Preferably, the container according to the invention is substantially in the form of a cylinder of revolution. In this particular case, the base or bases may be flat or domed.

The container with substantially the form of a cylinder of revolution according to the invention is advantageously bounded over at least a portion of its surface facing the outside by at least one external plate and facing the inside by at least one internal plate.

According to a first embodiment, it is advantageously bounded over at least one portion of its surface facing the outside by a single external plate and over at least one portion of its surface facing the inside by a single internal plate, the said external plate constituting the cylindrical portion of the container.

According to a second embodiment, it is advantageously bounded over at least a portion of its surface facing the outside by several external plates and facing the inside by several internal plates, the said external plates to which the internal plates are joined being fastened end to end and constituting the cylindrical portion of the container.

In the particular case of a container substantially in the form of a cylinder of revolution, the internal plate or plates may be joined to the external plate(s) over the entire inner surface or to a portion of the inner surface thereof.

In this particular case, the container according to the invention advantageously includes any piece of equipment needed to make the container a closed volume. In particular, the container preferably includes two bases fastened to the cylindrical portion, it being possible for these bases to be flat or domed.

At least one of these bases may optionally consist of at least one plate such as the external plate defined above to which one internal plate as defined above is joined in places so as to define a space for the circulation of the heat-transfer fluid. Alternatively, at least one of these bases may have, on its outer face, a double-walled jacket in which the heat-transfer fluid circulates.

The container according to the invention, preferably a container with substantially the form of a cylinder of revolution, is advantageously characterized by the fact that the internal plate has two changes of curvature between each joint. It therefore advantageously has two points of inflection between each joint in the plane perpendicular to the axis of the cylindrical portion when the space defined between the joints has the form of vertical channels.

In the container with substantially the form of a cylinder of revolution, in which the space defined between the joints for the circulation of the heat-transfer fluid has the form of vertical channels, the angle made in this space between the tangent to one of the points of inflection of the internal plate and the tangent to the external plate at the corresponding joint, the tangents being taken in the plane perpendicular to the axis of the cylindrical portion of the container, is advantageously less than or equal to 80°, preferably less than or equal to 60°, particularly preferably less than or equal to 50° and most particularly preferably less than or equal to 45°. An angle of less than or equal to 35°, or even 30° is most particularly preferred.

For containers substantially with the form of a cylinder of revolution in which the space defined between the joints has a form other than the form of vertical channels (for example horizontal channels) or for containers of form other than the substantially cylindrical form, the plane to be considered for defining the aforementioned angle may be defined in a similar manner.

The invention also relates to the use of the container according to the invention for the thermal conditioning of a fluid under pressure.

Preferably, the invention relates to the use of the container according to the invention for the thermal conditioning of a fluid under pressure by means of a heat-transfer fluid during exothermic and endothermic chemical reactions.

The container according to the invention may especially be a vessel, for example a vessel for the fermentation of wine, milk or cheese, or a chemical reactor. The container according to the invention is preferably a chemical reactor.

The term "chemical reactor" is understood to mean, for the purposes of the present invention, a container in which a chemical reaction takes place.

Thus, the invention also relates to a chemical reactor consisting of the container according to the invention.

The features defined above in the case of the container according to the invention also apply to the chemical reactor according to the invention.

The chemical reactor according to the invention is advantageously equipped with any piece of equipment needed for its use. Thus, the reactor according to the invention is preferably equipped with at least one stirring system, at least one inlet for injecting the reactants, with at least one outlet for recovering the products, optionally with at least one port for human inspection ("inspection port"), optionally with one or more probes for measuring the temperature and/or the pressure for example, optionally with at least one safety installation for detecting possible overpressures, optionally with at least one safety installation for stopping the reaction taking place in the reactor, optionally with at least one safety member (valve, rupture disc), optionally with at least one analyzer and optionally with at least one level detector.

Advantageously, the stirring system consists of a stirrer, optionally with an anti-vortex device and optionally with a draft tube.

As examples of stirrers, mention may be made of marine blade impellers, pitched-blade turbines, dual-flow blade impellers, hydrofoil blade impellers, Ekato ISOJET stirrers, agitators for viscous fluids (helical ribbon impellers, helical turbines, single-ribbon or double-ribbon stirrers with or without an internal screw, planetary Archimedes' screw, double-spiral or single-spiral Archimedes' screw, propellers with broad blades and single or double ribbons with or without an Archimedes' screw), disc and pitched-blade agitators, multi-directional submersible agitators, disc turbines of the Rushton type with pitched, curved or concave flat blades, flat-blade turbines (including paddles), pitched-blade or curved-blade turbines (including curved-blade turbine impellers or retreat-curve impellers), closed turbines with axial intake and radial delivery, closed disc and curved-blade turbines with or without stationary counter-parts, curved-blade turbines with a system of stationary counter-parts, dispersers (including toothed turbine impellers), tangential-flow anchor agitators, tangential-flow barrier agitators (including braced impellers), van Riet turbines, jet mixers and any combination of these agitators, including the case of several moving members with an individual or common drive system.

As examples of anti-vortex devices, mention may be made of anti-vortex devices of the flat-plate type, triangular anti-vortex devices, swing-tube anti-vortex devices, beaver-tail anti-vortex devices, finger-shaped anti-vortex devices, concave-blade anti-vortex devices and flattened-tube anti-vortex devices.

A preferred variant of the reactor according to the invention is a polymerization reactor.

The polymerization reactor may have a volume varying between a few liters and 300 $m^3$, depending on whether it is an experimental reactor, a pilot reactor or an industrial reactor.

When the polymerization reactor is an experimental or pilot reactor, advantageously it has a volume of at least 35 liters, preferably at least 50 liters and particularly preferably at least 100 liters. Advantageously, it has a volume of at most 200 liters, preferably at most 175 liters and particularly preferably at most 150 liters.

When the polymerization reactor is an industrial reactor, advantageously it has a volume of at least 20 $m^3$ and preferably at least 25 $m^3$. Advantageously, it has a volume of at most 300 $m^3$, preferably at most 250 $m^3$ and particularly preferably at most 200 $m^3$.

The reactor according to the invention has particularly beneficial advantages when it has a volume of at least 20 $m^3$ with the abovementioned volume preferences. In particular, it is possible for the reactor according to the invention not to be equipped with a condenser. Preferably, the reactor according to the invention is not equipped with a condenser.

The polymerization reactor may be a reactor for polymerizing any monomer. Advantageously, it is a reactor for polymerizing ethylenically unsaturated monomers. It is preferably a reactor for polymerizing halogenated vinyl monomers, particularly preferably vinyl chloride and most particularly preferably vinyl chloride in aqueous dispersion.

The term "halogenated vinyl monomers" is understood to mean, for the purposes of the present invention, ethylenically unsaturated monomers containing one or more halogen atoms, which are identical or different, and not containing a heteroatom other than the halogen atom(s).

As examples of halogenated vinyl monomers, mention may be made of halogenated vinyl monomers containing chlorine and halogenated vinyl monomers containing fluorine, and also halogenated vinyl monomers such as vinyl bromide.

As examples of halogenated vinyl monomers containing chlorine, mention may be made of vinyl chloride, vinylidine chloride, trichloroethylene, chloroprene and chlorotrifluoro-ethylene.

As examples of halogenated vinyl monomers containing fluorine, mention may be made of vinyl fluoride, vinylidene fluoride, trifluoroethylene, tetrafluoro-ethylene, hexafluoro-propylene and chlorotrifluoro-ethylene.

The expression "polymerization of halogenated vinyl monomers" is understood to mean both the homopolymerization of these halogenated vinyl monomers and their copolymerization with one another or with other ethylenically unsaturated monomers such as olefins, esters, nitriles, acrylic and methacrylic amides, and vinyl esters such as vinyl acetate.

The expression "polymerization of vinyl chloride" is therefore understood to mean both the homopolymerization of vinyl chloride and its copolymerization with one or more monomers chosen from halogenated vinyl monomers and ethylenically unsaturated monomers such as olefins, esters, nitriles, acrylic and methacrylic amides, and vinyl esters such as vinyl acetate. The vinyl chloride copolymers advantageously contain at least 50%, preferably at least 60%, particularly preferably at least 70% by weight of monomeric units derived from vinyl chloride. The homopolymerization of vinyl chloride is preferred.

The expression "polymerization in aqueous dispersion" is understood to mean, for the purposes of the present invention, radical polymerization in aqueous suspension and radical polymerization in aqueous emulsion and polymerization in aqueous microsuspension.

The expression "radical polymerization in aqueous suspension" is understood to mean, for the purposes of the present invention, any radical polymerization process carried out in aqueous medium in the presence of oil-soluble radical initiators and dispersants.

The expression "radical polymerization in aqueous emulsion" is understood to mean, for the purposes of the present invention, any radical polymerization process carried out in aqueous medium in the presence of water-soluble radical initiators and emulsifiers.

The expression "polymerization in aqueous microsuspension", also called "polymerization in homogenized aqueous dispersion" is understood to mean, for the purposes of the present invention, any radical polymerization process in which oil-soluble initiators are employed and an emulsion of monomer droplets is produced by powerful mechanical agitation and the presence of emulsifiers.

According to this particularly preferred variant, the polymerization reactor is advantageously equipped with a stirring system as defined above, with an inlet for the monomer or monomers, with an inlet for water, with an inlet for the other reactants (initiator(s), dispersant(s), etc.), with an outlet for recovering the polymer, with at least one inspection port, with one or more probes, with at least one safety installation for detecting possible overpressures and/or for stopping the reaction, with at least one safety member, optionally with at least one analyzer and optionally with at least one level detector.

According to this particularly preferred variant, the heat-transfer fluid is advantageously demineralized water. Preferably, the heat-transfer fluid is demineralized water with additives, as defined above.

The invention also advantageously relates to the use of the reactor according to the invention for the thermal conditioning of a fluid under pressure by means of a heat-transfer fluid, during a polymerization reaction, preferably during the polymerization of an ethylenically unsaturated monomer, particularly preferably of a halogenated monomer and most particularly preferably during the polymerization of vinyl chloride.

The invention also relates to a polymerization process using the chemical reactor according to the invention, in particular a process for polymerizing ethylenically unsaturated monomers, as defined above.

The features defined above in the case of the polymerization and the halogenated vinyl monomers also apply in the case of the use of the reactor according to the invention during a polymerization reaction and in the case of the polymerization process according to the invention.

The use of the reactor according to the invention for polymerizing ethylenically unsaturated monomers has particularly beneficial advantages, in particular the fact that the reactor according to the invention may possibly not be equipped with a condenser and is preferably not so equipped, thus eliminating all the disadvantages associated with the use of a condenser, such as for example those associated with foam formation.

The container and the reactor according to the invention may be obtained by any method. Good results are obtained if they are produced by means of the method according to the invention.

Finally, the invention therefore relates to a method for producing the container and the reactor according to the invention, comprising the steps of:

(1) placing two plates face to face, one of which is thicker than the other;

(2) welding the two plates on their perimeters, leaving an unwelded zone;

(3) next, welding the two plates according to the desired geometry of the circulation channels;

(4) depending on the desired form of the container and the reactor, giving the assembly consisting of the two welded plates, or several assemblies of two welded plates fastened together, the desired form in order to define the required volume, while placing each time the thicker plate on the outside of the said volume, constituting the external plate, and the thinner plate on the inside of the said volume, constituting the internal plate;

(5) injecting, via the unwelded zone in the perimeter, a fluid under pressure into the space between the two welded plates so as to create a space between the joints for the circulation of the heat-transfer fluid; and (6) optionally attaching any piece of equipment that has to be added, so as to close the container and the reactor, and attaching the means intended for adjusting the pressure of the heat-transfer fluid to that of the fluid under pressure, it being possible for step (6) to be carried out completely or partly before or after step (5).

In the method according to the invention, steps (4) and (5) may be reversed. Preferably, step (4) takes place before step (5).

The production method according to the invention may also include the step of attaching any piece of equipment needed for the use of the container and the reactor, this step being carried out completely or partly before, after or between steps (1) to (6).

In the particular case in which the container/reactor has substantially the form of a cylinder of revolution, the production method according to the invention advantageously comprises the following steps:

(1) placing two plates face to face, one of which is thicker than the other;

(2) welding the two plates on their perimeters, leaving an unwelded zone;

(3) then welding the two plates according to the desired geometry of the circulation channels;

(4) giving the assembly of the two welded plates or several assemblies of two welded plates fixed together, the desired cylindrical form whilst placing each time the thicker plate on the outside of the cylinder, constituting the external plate, and the thinner plate on the inside of the cylinder, constituting the internal plate;

(5) injecting, via the unwelded zone in the perimeter, a fluid under pressure into the space between the two welded plates so as to create a space between the joints for the circulation of the heat-transfer fluid; and (6) fixing the cylinder thus formed to two bases so as to close the container, and attaching the means intended for adjusting the pressure of the heat-transfer fluid to that of the fluid under pressure, it being possible for step (6) to be carried out completely or partly before or after step (5).

The production method according to the invention may also include the step of attaching any piece of equipment needed for the use of the container and the reactor, this step being carried out completely or partly before, after or between steps (1) to (6).

The features defined above in the case of the container and the reactor according to the invention also apply in the case of the production method according to the invention.

In the production method according to the invention, the two plates are advantageously welded in steps (2) and (3) by a welding method chosen from the methods mentioned hereinafter, the welding method used for step (2) being different from or the same as that used for step (3), namely laser welding, resistance welding, electrode welding, inert-gas-shielded welding with a refractory electrode, inert-gas-shielded welding with a consumable electrode, active-gas-shielded welding with a consumable electrode, flux-cored wire welding, submerged-arc welding or plasma arc welding. Preferably, the two plates are welded at steps (2) and (3) by the same welding method, chosen from laser welding and resistance welding. Particularly preferably, the two plates are welded at steps (2) and (3) by laser welding.

The fluid under pressure used in step (5) to create the space between the joints for the circulation of the heat-transfer fluid may be water or any other liquid such as, for example, hydraulic oils or molten salts. Preferably, the fluid under pressure is water or a hydraulic oil. Particularly preferably, the fluid under pressure is demineralized water or hydraulic oil. Most particularly preferably, the fluid under pressure is demineralized water with additives or hydraulic oil.

The space between the joints may have any form (geometry). Thus, it may be in the form of vertical channels, in the form of horizontal channels, in the form of oblique channels, in the form of hairpin channels or in free form In the method according to the invention, the welding at step (3) is preferably carried out so as to define vertical channels or horizontal channels. The width and the depth of these channels are preferably as defined above in the case of the container according to the invention.

Advantageously, the production method according to the invention makes it possible to preserve the surface finish of the internal plate after steps (1) to (4). In the production method according to the invention, a treatment step carried out on the surface of the internal plate (step T)) is, however, carried out before step (5) of injecting the fluid under pressure.

This surface treatment step may consist of a chemical polishing operation, a mechanical polishing operation, an electropolishing operation or a galvanizing operation (coating with a thin coat of zinc). Preferably, this surface treatment step consists of a mechanical polishing operation or an electropolishing operation.

The production method according to the invention may also include a post-treatment step (step (PT)) carried out on the internal plate after all of the preceding steps. In particular, this is a chemical polishing operation, an electropolishing operation, an enameling operation or an ebonite lining operation. Preferably, this post-treatment step is carried out by electropolishing.

The features defined above in the case of any piece of equipment needed for the use of the container and the reactor also apply in the case of the production method according to the invention.

The container and the reactor according to the invention have the advantage of allowing the exchange coefficient for exchange between the fluid under pressure and the heat-transfer fluid to be significantly improved, this coefficient being a minimum of around 1200 W/m$^2$.° C., but which may be up to 2000 W/m$^2$.° C., whereas the containers with a double-walled jacket fixed to the outer wall of the container of the prior art are usually characterized by an exchange coefficient of around 600 W/m$^2$.° C.

Considering the thermal resistance of the wall in contact with the fluid under pressure, it should be noted that the thermal resistance of an external wall made from 25 mm carbon steel clad with 4 mm of stainless steel in a container with a double-walled jacket fixed to the outer wall of the container is 0.00086 m$^{2°}$ C./W, but this reduces to a value of 0.0001 m$^{2°}$ C./W for an internal wall made of 1.5 mm thick stainless steel in a container such as the container according to the invention.

Compared with the containers of the prior art, in which the double-walled jacket is fixed to the inner face of the outer wall of the container, as is the case when the double-walled jacket is a semi-tubular coil that has to be wound in turns, it has the advantage of being simple to construct and is therefore characterized by lower construction costs. In the particular case of its use in polymerization, it has the advantage of allowing the polymerization cycle time to be reduced and therefore the productivity to be increased. When it is used for polymerizing vinyl chloride, it also has the advantage, compared with the device of the prior art with the double-walled jacket that is a semi-tubular coil and with the container shown diagrammatically in Patent Application FR 2 746 488, which have very sharp angles, thanks to the continuity of the internal plate, of preventing polymer particles from being attached thereto in the zones where it is joined to the external plate. This makes it possible to reduce the frequency with which the polymerization reactor has to be cleaned and allows the productivity of such a process to be considerably increased.

The reactor according to the invention also has the advantage, when it is used to polymerize vinyl chloride, of increasing the production capacity compared with the device of the prior art of the same size even though it is not equipped with a condenser. The method of producing the container and the reactor according to the invention has the advantage of being inexpensive, simple and automatable. It is also characterized by high reproducibility.

Particular features and details of the invention will become apparent from the following description of the appended figures which show diagrammatically a preferred embodiment of the container/reactor according to the invention.

BRIEF DESCRIPTION OF THE DRAWINGS

In these figures, the same reference numbers denote identical elements.

FIG. 1 describes a container/reactor 1 of substantially cylindrical form, bounded over at least part of its surface facing the outside by an external plate 3 and facing the inside by an internal plate 4, the internal plate 4 being joined by joints 5 to the external plate 3, so as to define a space 2 between the joints for the circulation of a heat-transfer fluid. The defined space 2 has the form of vertical channels in which the heat-transfer fluid entering at 6 and leaving at 7 circulates.

FIGS. 1 to 2 show, in different views, that the space 2 between the joints for circulation of a heat-transfer fluid is located on the inside of the container/reactor and that the external plate 3 is a plate with a thickness greater than that of the internal plate 4.

These figures also illustrate that the internal plate 4 and the external plate 3 are joined together by joints 5, via zone welding (weld seams), so as to define a space between the joints for the circulation of the heat-transfer fluid, that the internal plate is convex between the joints, that the external plate has no point of inflection, that the internal plate is tangential to the external plate at the joints and that the internal plate has two points of inflection between each joint.

Figure 1:
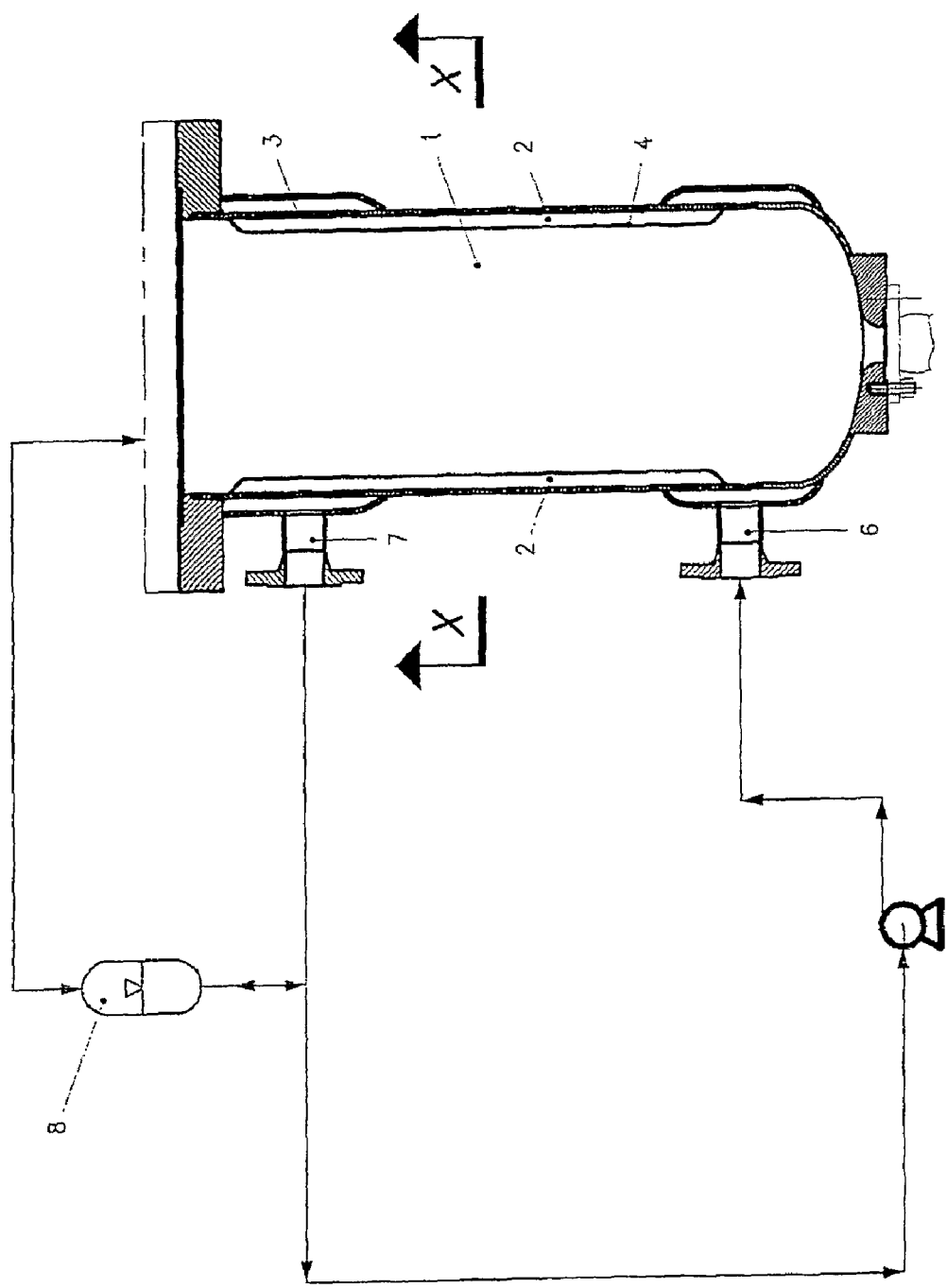
FIG. 1 is a side view of one particular embodiment of the container/reactor according to the invention which is a container/reactor with substantially the form of a cylinder of revolution, in particular a reactor for polymerizing vinyl chloride.
Figure 2:
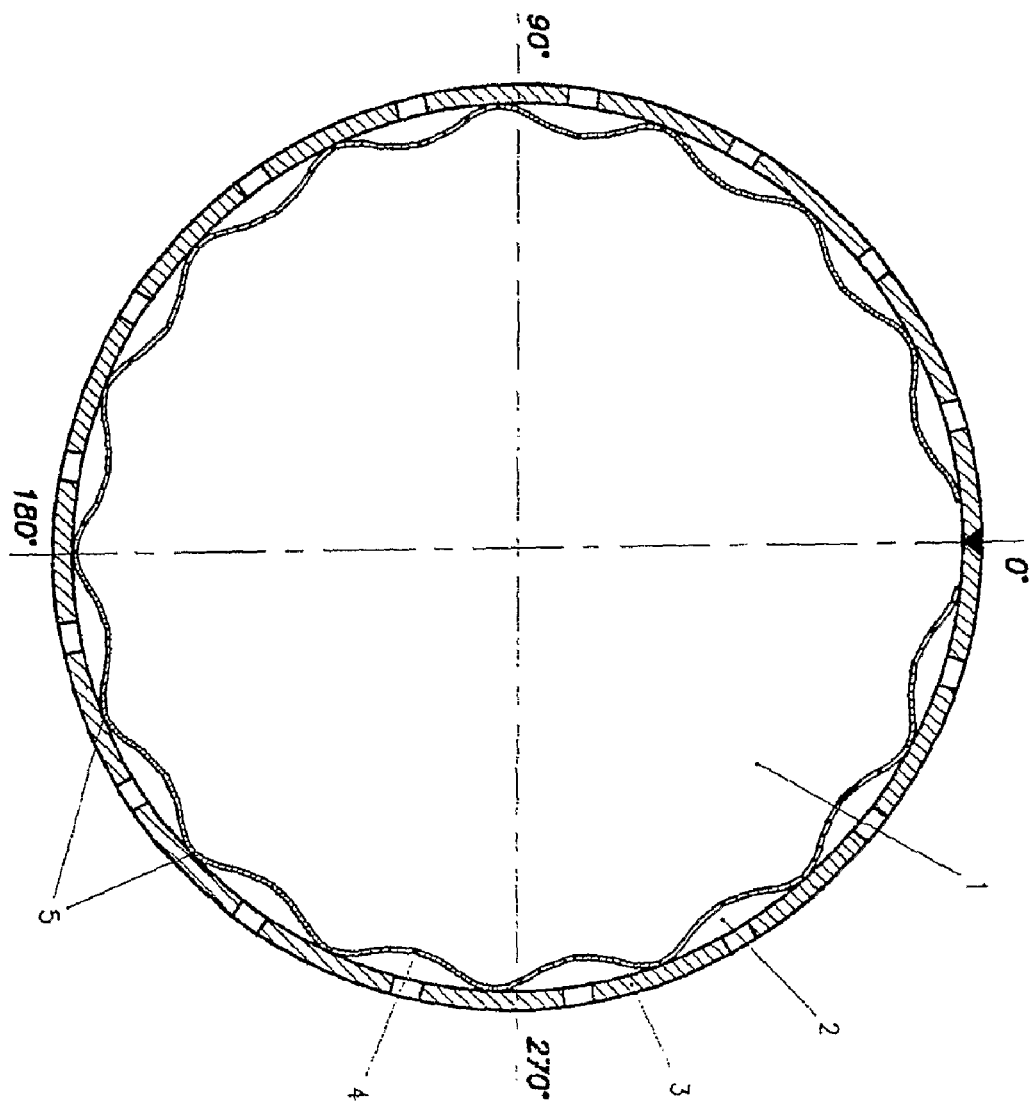
FIG. 2 is a cross section (in the plane perpendicular to the axis of the cylindrical portion) of the container/reactor shown in FIG. 1 along the axis X-X.

Finally, FIG. 1 shows that the container/reactor is provided with means 8 intended for adjusting the pressure of the heat-transfer fluid to that of the fluid under pressure.

The invention claimed is:

1. A container for thermal conditioning of a fluid under pressure, the container comprising:
   over at least a portion of its surface facing its exterior at least one external plate; and
   over at least a portion of its surface facing its interior at least one internal plate,
   the external plate being thicker than the internal plate, the external plate and the internal plate being joined together in places so as to define a space between joints configured to receive circulation of a heat-transfer fluid, and the container including means for adjusting the pressure of the heat-transfer fluid to that of the fluid under pressure,
   wherein the internal plate includes first portions facing the interior of the container that are convex relative to the interior of the container, and
   wherein the internal plate includes second portions facing the interior of the container that are concave relative to the interior of the container.

2. The container according to claim 1, in which the joints are laser welded joints.

3. The container according to claim 1, in which the internal plate is tangential to the external plate at the joints.

4. The container according to claim 1, in which the internal plate has a thickness of at most 2.5 mm.

5. The container according to claim 1, which is substantially in a form of a cylinder of revolution.

6. A method comprising:
   thermal conditioning a fluid under pressure in the container according to claim 1.

7. A chemical reactor comprising the container according to claim 1.

8. The reactor according to claim 7, wherein the reactor is a polymerization reactor.

9. The reactor according to claim 8, wherein the reactor has a volume of at least 20 m$^3$.

10. The reactor according to claim 8, wherein the reactor is a reactor for polymerizing vinyl chloride.

11. A process comprising:
    performing polymerization in a chemical reactor according to claim 8.

12. A method for producing a container according to claim 1 comprising:
    (1) placing first and second plates face to face, the first plate being thicker than the second plate;
    (2) welding together the first and second plates on their perimeters, leaving an unwelded zone;
    (3) next, welding together the first and second plates to produce a desired geometry of circulation channels;
    (4) forming the first and second welded plates into a desired form to define a volume, and placing the first plate facing the volume's exterior as an external plate, and placing the second plate facing the volume's interior as an internal plate; and
    (5) injecting, via an unwelded zone in the perimeter, a fluid under pressure into the space between the first and second welded plates so as to create a space between the joints for circulation of the heat-transfer fluid; and
    (6) attaching to the container means for adjusting the pressure of the heat-transfer fluid to that of the fluid under pressure.

13. The method according to claim 12, wherein the first and second plates are welded at (2) and (3) by laser welding.

14. The method according to claim 12, wherein the welding (3) is carried out so as to define vertical channels or horizontal channels.

15. The method according to claim 12, wherein a surface treatment is carried out on the surface of the internal plate prior to the injecting (5) of injecting the fluid under pressure.

16. The method according to claim 12, further comprising closing the container, at least partly, before the injecting (5).

17. The method according to claim 12, further comprising closing the container, at least partly, after the injecting (5).

18. The method according to claim 12, wherein the injecting (5) comprises forming first portions of the thinner plate as curved portions that are convex toward the interior of the volume, and forming second portions of the inner plate as curved portions that are concave toward the interior of the volume.

19. The container according to claim 1, wherein the first and second portions alternate with each other.

20. The container according to claim 1, wherein the first and second portions face each other across the internal volume.

21. A container for thermal conditioning of a fluid under pressure, the container comprising:
    over at least a portion of its surface facing its exterior at least one external plate; and
    over at least a portion of its surface facing its interior at least one internal plate,
    the external plate being thicker than the internal plate, the external plate and the internal plate being joined together in places so as to define a space between joints configured to receive circulation of a heat-transfer fluid and the container including means for adjusting the pressure of the heat-transfer fluid to that of the fluid under pressure,
    wherein the space defined between the joints for the circulation of the heat-transfer fluid includes vertical channels, and wherein an angle in this space between a tangent to one of the points of inflection of the internal plate and a tangent to the external plate at the corresponding joint, the tangents being taken in the plane perpendicular to the axis of the cylindrical portion of the container, is less than or equal to 80°.

* * * * *